(12) United States Patent
Voldsbekk

(10) Patent No.: US 10,132,948 B2
(45) Date of Patent: *Nov. 20, 2018

(54) MARINE STREAMER HAVING VARIABLE STIFFNESS

(71) Applicant: PGS Geophysical AS, Oslo (NO)

(72) Inventor: Rune Sindre Voldsbekk, Oslo (NO)

(73) Assignee: PGS Geophysical AS, Oslo (NO)

( * ) Notice: Subject to any disclaimer, the term of this patent is extended or adjusted under 35 U.S.C. 154(b) by 0 days.

This patent is subject to a terminal disclaimer.

(21) Appl. No.: 15/666,346

(22) Filed: Aug. 1, 2017

(65) Prior Publication Data

US 2017/0343692 A1 Nov. 30, 2017

Related U.S. Application Data

(63) Continuation of application No. 13/950,005, filed on Jul. 24, 2013, now Pat. No. 9,753,168.

(60) Provisional application No. 61/774,948, filed on Mar. 8, 2013.

(51) Int. Cl.
*G01V 1/38* (2006.01)
*G01V 1/20* (2006.01)

(52) U.S. Cl.
CPC ............ *G01V 1/3843* (2013.01); *G01V 1/201* (2013.01); *G01V 1/38* (2013.01); *G01V 2001/204* (2013.01)

(58) Field of Classification Search
CPC ........ G01V 1/38; G01V 1/3843; G01V 1/201; G01V 2001/204
See application file for complete search history.

(56) References Cited

U.S. PATENT DOCUMENTS

| | | |
|---|---|---|
| 4,241,427 A | 12/1980 | Swenson |
| 4,477,887 A | 10/1984 | Berni |
| 4,491,939 A | 1/1985 | Carpenter |
| 4,525,813 A | 6/1985 | Burrage |
| 4,781,140 A | 11/1988 | Bell et al. |
| 6,775,203 B2 | 8/2004 | Fageras et al. |
| 6,775,204 B2 | 8/2004 | Scott |
| 6,903,998 B2 | 6/2005 | Vaage |
| 7,028,988 B2 | 4/2006 | Scott |
| 7,142,481 B1 | 11/2006 | Metzbower et al. |
| 7,167,412 B2 | 1/2007 | Tenghamn |
| 7,221,619 B1 | 5/2007 | George |

(Continued)

FOREIGN PATENT DOCUMENTS

| | | |
|---|---|---|
| EP | 1522877 | 4/2005 |
| GB | 2394047 | 11/2002 |

(Continued)

OTHER PUBLICATIONS

UK Examination Report for Application No. GB 1402969.8 dated Jan. 10, 2017.

(Continued)

*Primary Examiner* — Hovhannes Baghdasaryan

(57) ABSTRACT

Disclosed are methods and systems for performing marine geophysical surveys that utilize a streamer having variable stiffness. An embodiment discloses a sensor streamer comprising: an outer surface; tension members within the outer surface extending along a length of the sensor streamer; spacers disposed within the outer surface along the length of the sensor streamer; a geophysical sensor disposed in an interior of one of the spacers; and an actuator assembly configured to apply tension to the tension members.

21 Claims, 7 Drawing Sheets

(56) References Cited

U.S. PATENT DOCUMENTS

| | | |
|---|---|---|
| 7,260,024 B2 | 8/2007 | Goujon et al. |
| 7,298,672 B1 | 11/2007 | Tenghamn et al. |
| 7,352,654 B2 | 4/2008 | Goujon et al. |
| 7,426,439 B2 | 9/2008 | Ozdemir et al. |
| 7,468,932 B2 | 12/2008 | Tenghamn |
| 7,641,421 B2 | 1/2010 | Roodenburg et al. |
| 7,737,698 B2 | 6/2010 | Tenghamn et al. |
| 7,778,114 B2 | 8/2010 | Goujon et al. |
| 7,800,976 B2 | 9/2010 | Stokkeland et al. |
| 7,834,632 B2 | 11/2010 | Tenghamn et al. |
| 7,974,152 B2 | 9/2011 | Frivik et al. |
| 8,102,731 B2 | 1/2012 | Cambois |
| 8,267,031 B2 | 9/2012 | Austad |
| 8,319,497 B2 | 11/2012 | Sudow et al. |
| 9,057,798 B2 | 6/2015 | Juhasz et al. |
| 2007/0266804 A1 | 11/2007 | Goujon et al. |
| 2008/0267009 A1 | 10/2008 | Frivik et al. |
| 2009/0092006 A1 | 4/2009 | Teigen et al. |
| 2009/0161487 A1 | 6/2009 | Kjellgren et al. |
| 2010/0165792 A1 | 7/2010 | Stenzel et al. |
| 2010/0208550 A1 | 8/2010 | Gallagher et al. |
| 2010/0322565 A1 | 12/2010 | George et al. |
| 2011/0044128 A1 | 2/2011 | Stoteig et al. |
| 2011/0044130 A1 | 2/2011 | Traetten et al. |
| 2011/0058449 A1 | 3/2011 | Stenzel |
| 2011/0248718 A1 | 10/2011 | Sudow et al. |
| 2012/0081994 A1 | 4/2012 | Huson et al. |
| 2014/0185409 A1 | 7/2014 | Voldsbekk |
| 2014/0185410 A1 | 7/2014 | Voldsbekk |
| 2014/0185411 A1 | 7/2014 | Voldsbekk |
| 2014/0185412 A1 | 7/2014 | Voldsbekk |

FOREIGN PATENT DOCUMENTS

| | | |
|---|---|---|
| GB | 2509397 | 2/2014 |
| WO | 2002029948 | 4/2002 |
| WO | 2004036252 | 4/2004 |
| WO | 2004079398 | 9/2004 |

OTHER PUBLICATIONS

UK Examination Report for Application No. GB 1402969.8 dated Nov. 3, 2016.

Notice of Allowance for U.S. Appl. No. 13/950,005 dated May 23, 2017.

French Search Report and Written Opinion for Application No. FR1451909 dated Mar. 24, 2017.

Non-final Rejection for U.S. Appl. No. 13/950,005 dated Dec. 2, 2016.

Non-final Rejection for U.S. Appl. No. 13/950,005 dated Apr. 14, 2016.

Final Rejection for U.S. Appl. No. 13/950,005 dated Mar. 3, 2017.

Final Rejection for U.S. Appl. No. 13/950,005 dated Aug. 9, 2016.

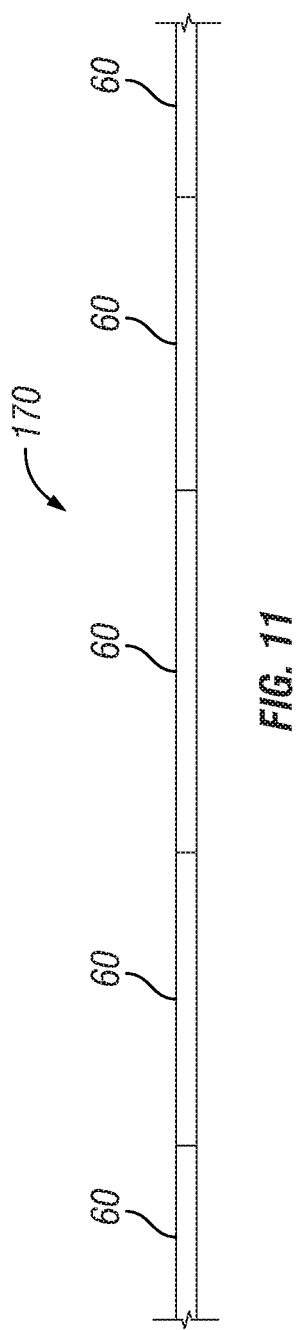

MARINE STREAMER HAVING VARIABLE STIFFNESS

CROSS-REFERENCE TO RELATED APPLICATIONS

This application is a continuation of U.S. patent application Ser. No. 13/950,005, entitled "Marine Streamer Having Variable Stiffness," filed on Jul. 24, 2013, which claims the benefit of U.S. Provisional Application No. 61/774,948, entitled "Marine Streamer Having Variable Stiffness," filed on Mar. 8, 2013, the entire disclosures of which are incorporated herein by reference.

BACKGROUND

The present invention relates generally to the field of marine geophysical surveying. More particularly, in one or more embodiments, this invention relates to methods and systems for performing marine geophysical surveys that utilize a streamer having variable stiffness.

Techniques for marine surveying include marine geophysical surveying, such as seismic surveying and electromagnetic surveying, in which geophysical data may be collected from below the Earth's surface. Geophysical surveying has applications in mineral and energy exploration and production to help identify locations of hydrocarbon-bearing formations. Certain types of marine geophysical surveying, such as seismic or electromagnetic surveying, may include towing an energy source at a selected depth—typically above the seafloor—in a body of water. One or more geophysical sensor streamers also may be towed in the water at selected depths by the same or a different vessel. The streamers are typically cables that include a plurality of geophysical sensors disposed thereon at spaced apart locations along the length of the cable. The geophysical sensors may be configured to generate a signal that is related to a parameter being measured by the sensor. At selected times, the energy source may be actuated to generate, for example, seismic or electromagnetic ("EM") energy that travels downwardly into the subsurface rock. Energy that interacts with interfaces, generally at the boundaries between layers of rock formations, may be returned toward the surface and detected by the geophysical sensors on the streamers. The detected energy may be used to infer certain properties of the subsurface rock, such as structure, mineral composition and fluid content, thereby providing information useful in the recovery of hydrocarbons.

In geophysical surveying, the streamer is typically a cable that is stored on a drum on the towing vessel. The streamers are typically made of multiple components, such as electrical conductors, fiber optics, and stress-supporting members, all bundled together and covered with a protective outer skin. The streamer may be up to several kilometers in length. In general, the streamer has little stiffness in directions other than inline, so it can move easily both laterally and in torsion/rotation when deployed in the water. When sensors such as velocity, position, and acceleration sensors are incorporated into the streamer, the movements are picked up directly by the sensors. Unlike hydrophones which only pick up the movements indirectly because of improvements over the years, these other sensors may have a high level of noise which is not interesting for the marine survey. For example, the noise may be measurements of local conditions in the surrounding water rather than reflections from the Earth below.

Under a load of pressure on only a small portion of the outside, a streamer will bend, held back only by the tension, bending and torsional stiffness of the streamer, and the mass of the cable content, depending on the direction, distribution, and size of the pressure. Low bending and torsional stiffness for the streamer should result in little added mass, but cause large local movement. As result, the streamer may have large local sensor recordings (i.e., measurements of local conditions in the surrounding water) and also large waves of motion traveling through the cable. Low stiffness may also result in large sagging of the cable between steering devices with wings commonly used to control lateral or vertical position of the streamer. Because of the large sagging, there may be large angles between the cable and fluid flow, further increasing turbulence and noise generation from hydrodynamic flow.

Accordingly, there is a need for improved methods and systems for deploying streamers in seismic surveys having increased stiffness both laterally and in torsion to reduce noise sources in marine seismic surveys.

BRIEF DESCRIPTION OF THE DRAWINGS

These drawings illustrate certain aspects of some of the embodiments of the present invention and should not be used to limit or define the invention.

FIG. 11 illustrates an assembly of streamer segments 60 in accordance with embodiments of the present invention.

DETAILED DESCRIPTION

The present invention relates generally to the field of marine geophysical surveying. More particularly, in one or more embodiments, this invention relates to methods and systems for performing marine geophysical surveys that utilize a streamer having variable stiffness. Embodiments may include the streamer having a storable configuration in which the streamer may be deployed and stored on a drum onboard a survey vessel, for example. Embodiments may further include the streamer having an operational configuration in which the streamer has a higher stiffness than in the storable configuration. After deployment into the water, for example, the streamer may be changed from the storable configuration to the operational configuration. Some or all of the geophysical survey may then be conducted with the streamer in the operational configuration.

Figure 1:
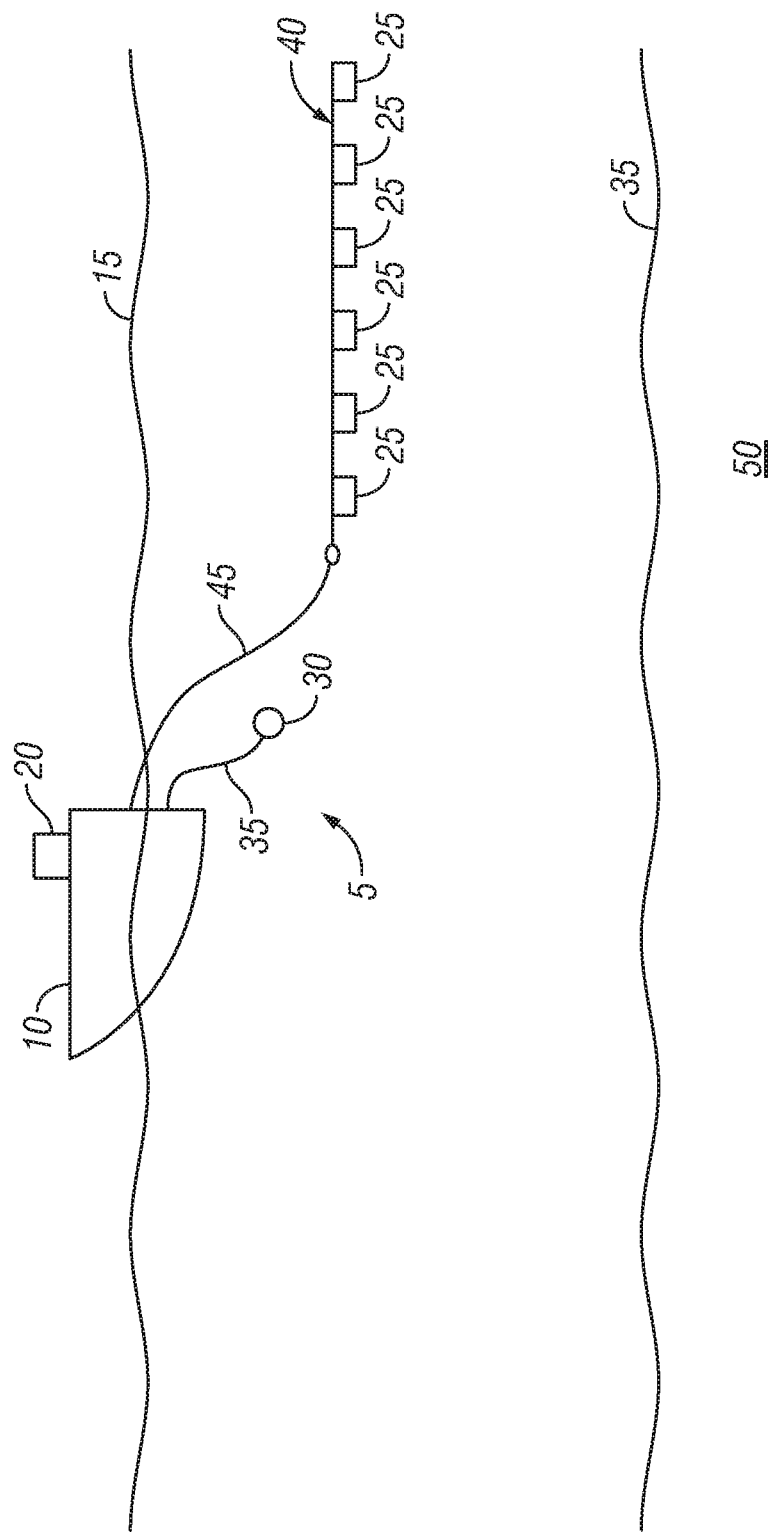
FIG. 1 illustrates an example embodiment of a marine geophysical survey system that comprises a streamer having variable stiffness in accordance with the present invention.

FIG. 1 illustrates a marine geophysical survey system 5 in accordance with embodiments of the present invention. In the illustrated embodiment, the system 5 may include a survey vessel 10 that moves along the surface of a body of water 15, such as a lake or ocean. The survey vessel 10 may include equipment, shown generally at 20 and collectively referred to herein as a "recording system." By way of example, the recording system 20 may include one or more devices (none shown separately) for determining geodetic position of the survey vessel 10 (e.g., a global positioning system satellite receiver signal), detecting and making a time indexed record of signals generated by each of a plurality of geophysical sensors 25, and/or for actuating one or more energy sources 30 at selected times.

The survey vessel 10 or a different vessel (not shown) may tow a source cable 35 that includes the one or more energy sources 30. In other embodiments (not shown), one or more of the energy sources 30 may be mounted to the hull of the survey vessel 10. The energy sources 30 may be any selectively actuable sources suitable for subsurface geophysical surveying, including without limitation, electromagnetic field generators, seismic air guns, water guns, marine vibrators or arrays of such devices.

The survey vessel 10 or a different vessel (not shown) may also tow a streamer 40 through the body of water 15. As will be discussed in more detail below, the streamer 40 may have a variable stiffness in accordance with embodiments of the present invention. For example, the streamer 40 may have a storable configuration in which the streamer 40 has a stiffness that allows the streamer 40 to be wound onto a winch and stored on the survey vessel 10. At a desired time, the streamer 40 can be rigidified such that the streamer 40 is changed to an operational configuration having a higher stiffness than in the storable configuration. For example, the bending, inline, and/or torsional stiffness of the streamer 40 may be increased. The geophysical sensors 25 may be disposed on the streamer 40 at spaced apart locations. The type of the geophysical sensors 25 is not a limit on the scope of the present invention and may be particle motion-responsive geophysical sensors such as geophones and accelerometers, pressure-responsive geophysical sensors such as hydrophones, pressure time gradient-responsive geophysical sensors, electrodes, magnetometers, temperature sensors or combinations of the foregoing. A lead-in 45 may couple the streamer 40 to the survey vessel 10. In the illustrated embodiment, the lead-in 45 may comprise a cable. In some embodiments, the streamer 40 may be towed near the surface of the body of water 15, for example, at a depth of about 25 meters or less, for example. In alternative embodiments, the streamer 40 may be towed at a deeper depth. For example, the streamer 40 may be towed at a depth of up to about 50 meters or more. While the present example, shows only one streamer 40, the prevent invention is applicable to any number of laterally spaced apart streamers towed by the survey vessel 10 or any other vessel. For example, in some embodiments, eight or more laterally spaced apart streamers may be towed by the survey vessel 10, while in other embodiments, up to twenty-six or more laterally spaced apart streamers may be towed by the survey vessel 10. Although shown with a nearly horizontal depth profile, streamer 40 may have a variable depth profile when deployed in the water.

During operation, certain equipment (not shown separately) in the recording system 20 may actuate the one or more energy sources 30 at selected times. In seismic surveying, actuation of the energy sources 30 should cause seismic energy to emit from the energy sources 30 with a seismic signal propagating downwardly through the body of water 15 and into one or more rock formations 50 below the water bottom 55. A modified seismic signal that is reflected by the rock formations 50 may be detected by the geophysical sensors 25 as the modified signal travels upwardly through the body of water 15, for example. In electromagnetic surveying, actuation of the energy sources 30 should generate electric and/or magnetic fields in the water 15 that interact with the rock formations 50. The electric and/or magnetic fields can be detected by the geophysical sensors 25. The detected signal and/or fields may be used to infer certain properties of the rock formations 50, such as structure, mineral composition and fluid content, thereby providing information useful in the recovery of hydrocarbons, for example.

Figure 2:
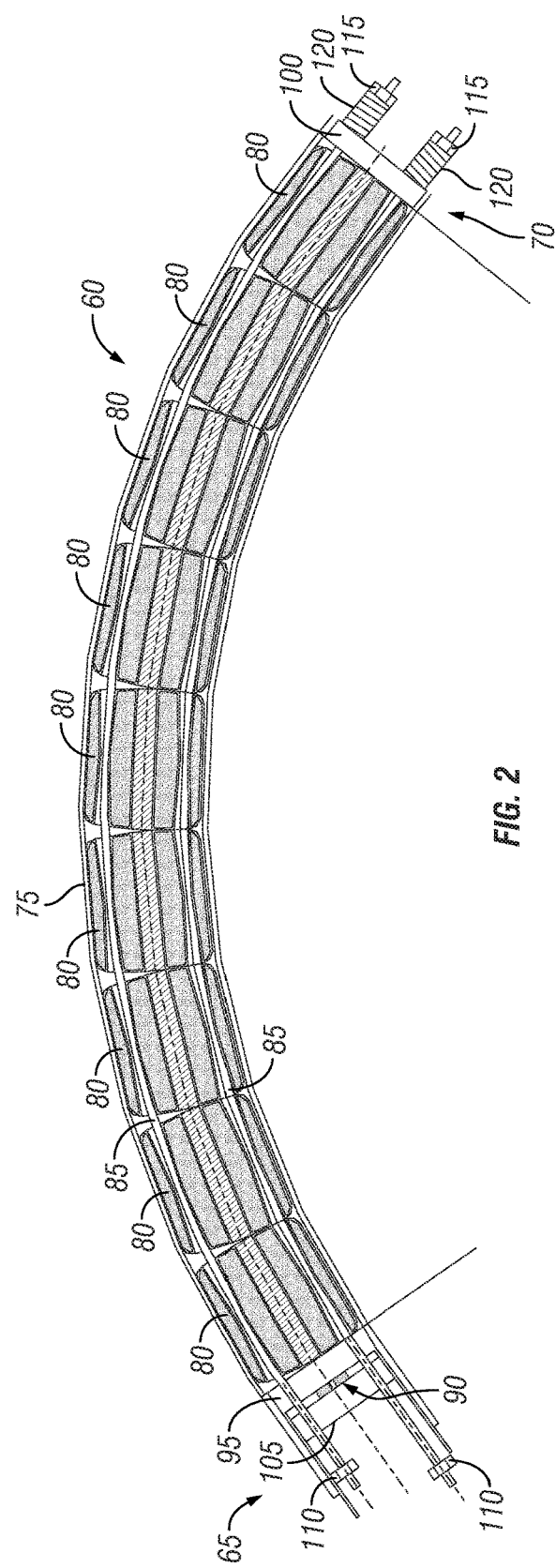
FIG. 2 illustrates a cut-away view of an example embodiment of a streamer segment in a storable configuration in accordance with the present invention.
Figure 3:
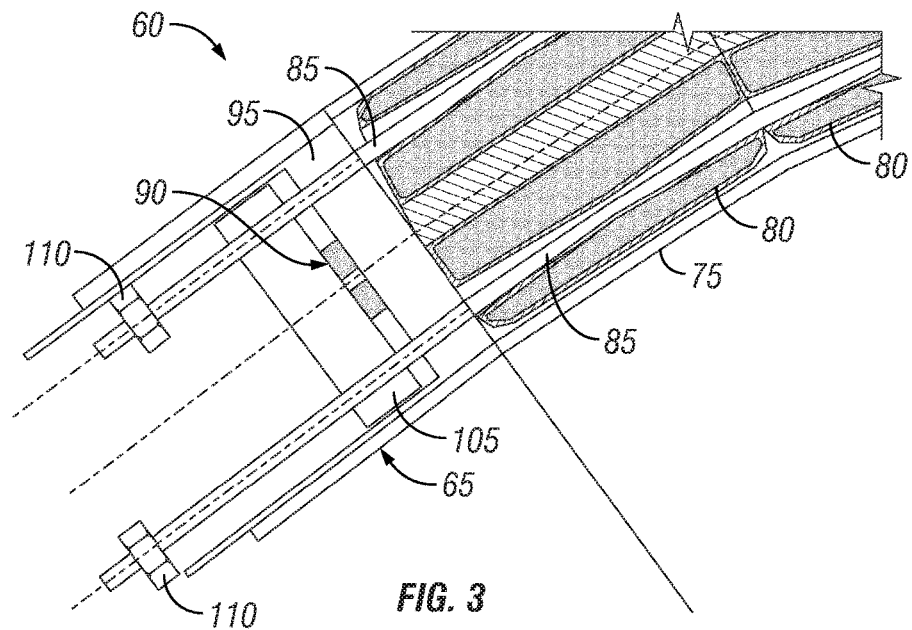
FIG. 3 illustrates a cut-away view of one end of the streamer segment of FIG. 2.
Figure 4:
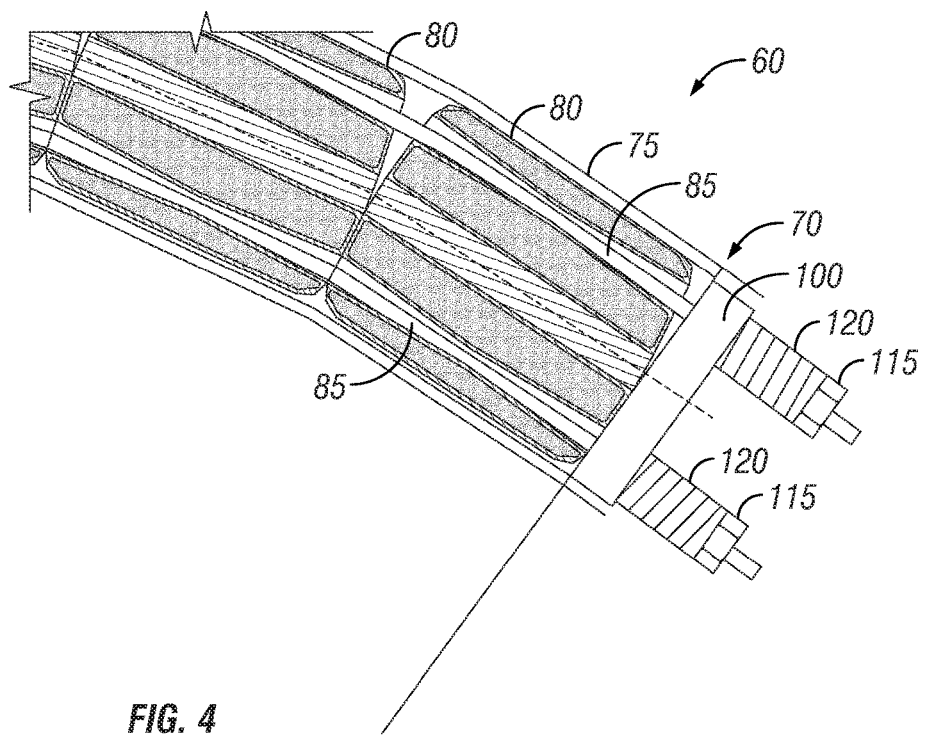
FIG. 4 illustrates a cut-away view of the opposite end of the streamer segment of FIG. 2.
Figure 5:
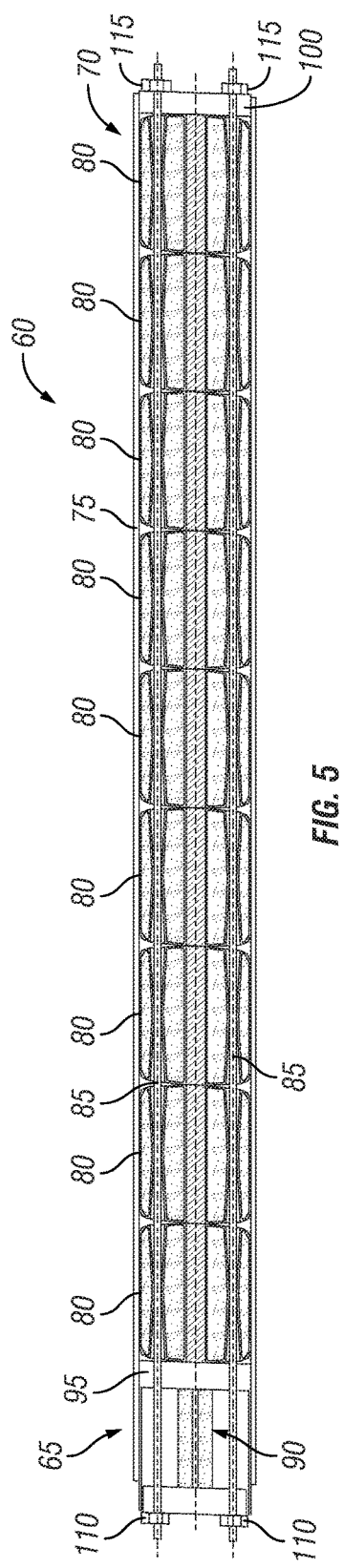
FIG. 5 illustrates a cut-away view of an example embodiment the streamer segment of FIG. 2 in an operational configuration in accordance with embodiments of the present invention.
Figure 6:
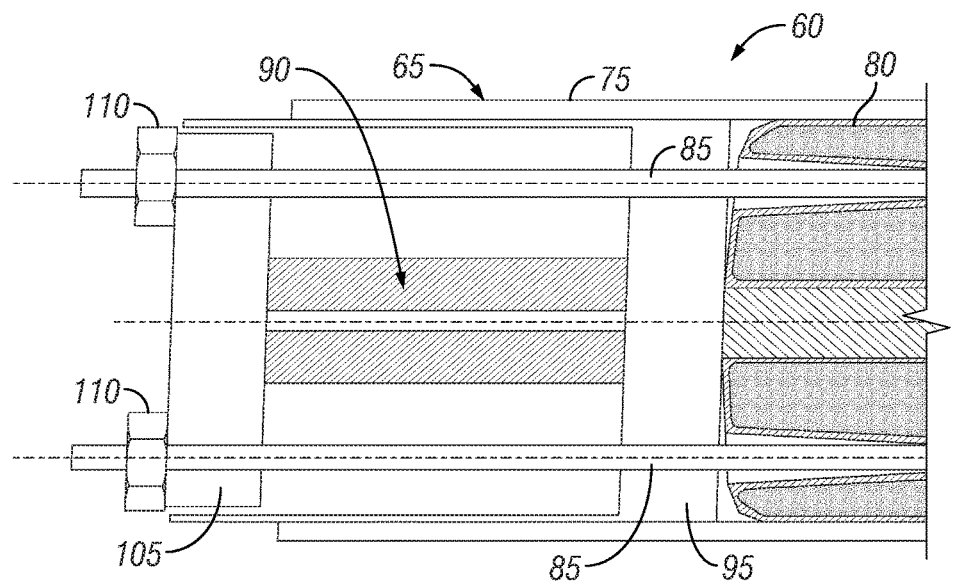
FIG. 6 illustrates a cut-away view of one end of the streamer segment of FIG. 5.

A streamer 40 as shown in FIG. 1 may be made from a plurality of streamer segments 60 connected end-to-end behind the survey vessel 10 (shown on FIG. 1). FIGS. 2-6 illustrate views of a streamer segment 60 having a variable stiffness in accordance with example embodiments of the present invention. FIGS. 2-4 illustrate the streamer segment 60 in a storable configuration. FIGS. 5 and 6 illustrate the streamer segment 60 in an operational configuration in which the streamer segment 60 has an increased stiffness, such as bending, inline, and/or torsional stiffness. In addition, the streamer segments 60 may also be used to form the source cable 35 in embodiments of the present invention. The streamer segments 60 may be a structure for a number of items, including feed lines, gas lines, optical and/or electrical signals, power, external devices, geophysical sensors, tension sensors, and geophysical sources. The streamer segment 60 may have a length, for example, in a range of from about 10 meters to about 150 meters and, alternatively, from about 60 meters to about 150 meters. Depending on the particular application, the streamer 40 formed from the streamer segments 60 may have a length in a range of from about 200 meters to about 2000 meters or longer, for example. In some embodiments, the streamer segments 60 may each have an aspect ratio (ratio of width to height) of about 1 to about 8, for example. The width of the streamer segments 60 generally refers to a measurement of the extent of a particular streamer segment 60 from one side of the streamer segment 60 to the other while the height refers to the measurement of the extent of the particular streamer segment 60 from bottom of the streamer segment 60 to its top. For streamer segments 60 that are generally circular in cross-section, the width and height should both be equal to the diameter so that the aspect ratio should be approximately 1.

In some embodiments, the streamer segment 60 may have a proximal (i.e., close to the survey vessel 10) end 65 and a distal (i.e., far from the survey vessel 10) end 70. In the illustrated embodiment, the streamer segment 60 includes an outer surface (such as jacket 75), spacers 80, tension members 85, and a tensioning actuator 90. In some embodiments, the outer surface may be identified by a jacket 75 which at least partially covers streamer segment 60. The jacket 75 generally may function as a partial or complete exterior cover that protects the internal components of the streamer 60 from water intrusion, for example. In some embodiments, the jacket 75 may be made from a flexible, acoustically transparent material, which may be a plastic and/or elastomeric material, such as polyurethane. One or more plates may be located at or near the axial end of the jacket 75. For example, a proximal plate 95 may be located at or near the proximal end 65, and a distal plate 100 may be located at or near the distal end 70.

In some embodiments, the tension members 85 may extend generally the entire length of streamer 40. In general, the tension members 85 may function to provide the streamer segment 60 with the ability to carry axial mechanical load, for example. For example, the tension members 85 may carry axial load along the length of the streamer segment 60. In some embodiments, the tension members 85 may be a metal, such as steel (e.g., stainless steel) or high strength plastic materials. Examples of suitable plastic materials include aramid fibers such as Kevlar polyamides (also referred to as "aramid fibers") such as (e.g., aramids, such as Kevlar, Pol. The tensions members 85 may be in the form of a cable or fiber robe, for example. At the proximal end 65, the tension members 85 may extend proximally beyond the proximal plate 95. The tension members 85 may also extend proximally beyond an actuator plate 105 which is located at the proximal end 65. As illustrated, from the proximal end 65, the tension members 85 may extend through the actuator plate 105, through the proximate plate 95, and then through the spacers 80 to the distal end 70. At the distal end 70, the tension members 85 may extend through the distal plate 100. In accordance with present embodiments, tension members 85 can translate axially with respect to the actuator plate 105, the proximal plate 95, the spacers 80, and the distal plate 100. For example, in the storable configuration of the streamer segment 60, the tension members 85 may be allowed to slide in the spacers 80. Nuts (such as axial nuts 110 and distal nuts 115) or other suitable mechanical stops may be located at either axial end of the tension members 85. As illustrated, the axial end of the tension members 85 may be spring-loaded with springs 120 disposed on the tensions members 85 between the distal nuts 115 and the distal plate 100. The springs 120 may be compressed as tension is applied to the tension members 85 via the tensioning actuator 90.

As illustrated, the streamer segment 60 may further comprise a plurality of spacers 80 disposed along the length of the streamer 40. As will be discussed in more detail below, the spacers 80 may be so densely packed that, when the tensioning actuator 90 applies tension to the tension members 85, the spacers 80 may be compressed together aligning the spacers 80 in a rigid line. The spacers 80 may be made from a foam material to provide buoyancy, for example. For example, the spacers 80 may include a foamed material that fills void spaces (e.g., foamed material 140 on FIGS. 7 and 8), such as a foamed polyurethane or other suitable material. As illustrated, a large volume of the streamer segment 60 may be occupied by the spacers 80. For example, at least about 50% of the internal volume and as much as 90% or more of the internal volume of the streamer segment 60 and/or streamer 40 may be occupied by the spacers 80. Typically, oil or other suitable void-filling material occupies the interior volume of the streamer segment 60. However, because a high volume of the streamer segment 60 may be occupied by the spacers 80, less oil or other void-filling material can be used, thus minimizing potential problems that may be caused by leakage. In addition, foamed materials such as rigid foams can deal with the pressures of more than a few meters while also giving more than 4 times the buoyancy of some void-filling materials, such as oils. Moreover, the interior of the spacers 80 may be formed with closed, hollow cavities so that a leak in the jacket 75, for example, would not necessarily fill the entire volume.

In some embodiments, the tensioning actuator 90 may be located at the proximal end 65 of the streamer segment 60. The tensioning actuator 90 may generally be configured to apply tension other than towing tension to the tension members 85. As illustrated, the tensioning actuator 90 may be coupled to the actuator plate 105. The tensioning actuator 90 may cause the actuator plate 105 to move axially outward into engagement with the proximal bolts 110 or other mechanical stop on the tension members 85. The actuator plate 105 transfers mechanical force from tensioning actuator 90 to the tension members 85 as will be discussed in more detail below. One example of a suitable tensioning actuator 90 is a linear drive that generates motion in a straight line to move the actuator plate 105. Other suitable actuated drives may also be used for applying tension to the tension members 85 in accordance with embodiments of the present invention. Some examples of suitable actuated drives may be electric or mechanical (e.g., hydraulic, pneumatic) actuated drives.

Those of ordinary skill in the art, with the benefit of this disclosure, should appreciate that other components, sensors, actuators, transducers, conductor cables, and other electronics (e.g., tanks, batteries, etc.) may also be incorporated into the streamer segments 60. Example sensors (e.g., geophysical sensor 25 on FIG. 1) that may be incorporated include sound/pressure sensors, motion sensors (speed, velocity, and/or acceleration), EM sensors, magnetism (e.g., compass), pressure sensors, depth sensors, tilt sensors, tension sensors, surface or bottom echosounders/mappers, among others. In some embodiments, one or more actuators may be incorporated into the streamer segments 65. Example actuators may include control surfaces, ballast tanks, openings, covers/lids, and connection points, among others. For example, control surfaces (such as wings) for steering or rotational position may be used. The control surfaces may act to provide depth and/or lateral control for the streamer segments 60. Moreover, the control surfaces may allow the streamer segments 60 to perform a desired move while in the water, such as an undulation, surfacing, diving, rescue, or recovery. Ballast tanks may be also be incorporated that can allow the streamer segments 60 to maintain depth, surface, or compensate for water intrusion, such as by gassing a flooded chamber in the streamer segments 60. Openings may also be provided for access to sensor surfaces, ballast, and/or weight/mass center manipulation. Connection points that are openable and/or closable may also be provided in the streamer segments 60, such as valves or ports for feed or transmission lines. Covers/lids that are openable and/or closable may also be provided, which may enable cleaning and/or streamlined handling, for example. Conductor cables that may be incorporated into the streamer segments 60 may include insulated electrical conductors and/or optical conductors for conducting electrical and/or optical signals to/from the recording system 20 shown on FIG. 1. In some embodiments, one or more of the conductor cables may also carry electrical power to various processing circuits disposed in the streamer segment 60, for example.

In accordance with present embodiments, the streamer segment 60 may have a variable stiffness. For example, the streamer segment 60 may have a storable configuration in which the streamer may be deployed and stored on a drum onboard a survey vessel (e.g., survey vessel 10 on FIG. 1). FIGS. 2-4 illustrate the streamer segment 60 in the storable configuration. In the storable configuration, the tensions members 85 may be allowed to slide with respect to the spacers 80. The spacers 80 may be packed closely in the streamer segment 60, but have enough gaps in between for the streamer segment 60 to bend. As best seen in FIG. 2, the streamer segment 60 may freely bend in the storable configuration, for example, to wound onto a drum. At a desired time, the streamer segment 60 may be placed in an operational configuration in which the streamer segment 60 has an increased stiffness. In the operational configuration, the streamer segment 60 is generally characterized as being rigid in that it has as bending, torsion, and/or inline stiffness than can be maintained for considerable lengths, for example, up to about 10 meters, about 50 meters, about 100 meters, or even longer when assembled end-to-end with other streamer segments 60 in the operational configuration. Unlike cables and structures that have been used previously as lead-ins and streamers, the streamer segments 60 in the operational configuration will generally not form catenary, sinus hyperbolic, or parabolic curvatures over at least portions of the length, but will rather generally exhibit elastic behavior with deformation according to deformation of beams. In some embodiments, an assembly of streamer segments 60 may be characterized as being rigid for a length of about 25 meters or longer wherein the streamer segments 60 have a smallest width or height of about 1 meter or less.

Embodiments of the present technique may be used with a streamer segments 60 having a bending stiffness of 700 Newton-square meters ("$Nm^2$") or greater when in the operational configuration. In some embodiments, the streamer segment 60 or chain of streamer segments in the operational configuration may have a bending stiffness of 700 Newton-square meters ("$Nm^2$") or greater for considerable lengths (e.g., over about 25 meters or more). The stiffness of 700 $Nm^2$ corresponds to a stiffness in a cantilever beam of 1-meter length fixed in one end with a load of 1 Newton in the other, deforming roughly 0.5 mm under the load. This corresponds to an aluminum (with Young's modulus of 70 GPa) tube with a 2-inch outer diameter and a thickness of 0.2 millimeters, a steel (with Young's modulus of 210 GPa) tube with a 2-inch outer diameter with a thickness of 0.03 millimeters or a circular rod with a Young's modulus of 2 GPa. Each of these items, i.e., the aluminum tube, the steel tube, and the circular rod, are examples of items with a bending stiffness of 700 $Nm^2$. A 2-inch outer diameter typically requires 5% deformation to be wound on a 2-meter drum, which is difficult for most materials. Most rigid materials can deform a maximum of 0.1% or, in extreme cases, 1% so they cannot be wound on a drum without being wound in a wire or umbilical. Lower strength materials may be able to deform but will then be soft to enable bending. In the operational configuration, the streamer segment 60 may be in danger of damage or permanent deformation if subjected to 3 kN or more.

FIGS. 5 and 6 illustrate the streamer segment 60 in the operational configuration. In some embodiments, the spacers 80 may be so densely packed that, when the tensioning actuator 90 applies tension to the tension members 85, the spacers 80 may be compressed together aligning the spacers 80 in a rigid line, as best seen in FIG. 5, increasing the bending stiffness of the streamer segment 60. The spacers 80 in compression and the tension members 85 in compression should contributed to the bending stiffness of the streamer segment 60.

In the illustrated embodiment, the tensioning actuator 90 may be used to apply tension to the tension members 85 for placement of the streamer segment 60 into the operational configuration. As best seen by comparing FIGS. 3 and 6, the tensioning actuator 90 may cause the actuator plate 105 to move axially outward into engagement with the proximal bolts 110 or other mechanical stop on the tension members 85. In this manner, the actuator plate 105 may transfer mechanical force from tensioning actuator 90 to the tension members 85 causing the tension members 85 to move axially. As the tension members 85 move, the distal nuts 115 on the tensions members 85 engage the distal plate 100 causing the distal plate 100 to apply force onto the spacers 80 compressing the spacers 80 between the distal plate 100 and the axial plate 95. Compression of the spacers 80 aligns the spacers 80 into a rigid line.

In some embodiments, the tension applied to the tension members 85 by the tensioning actuator 90 may be higher than operational tension from towing. When this operational tension is added to the tension from the tensioning actuator 90, the load increases on the tension members 85 while decreasing on the spacers 80. If this operational tension is greater than the tension from the tensioning actuator 90, the spacers 80 may decompress leaving some gaps that could reduce stiffness of the streamer segment 60. Accordingly, it may be desired in some embodiments for tension from the tensioning actuator 90 to exceed the operational tension from towing. When in tension from the tensioning actuator 90, all the spacers 90 should move when torsion of bending loads are added to the streamer segment 60 and, thus, should add stiffness according to their moment of inertia times their Young's modulus.

Figure 7:
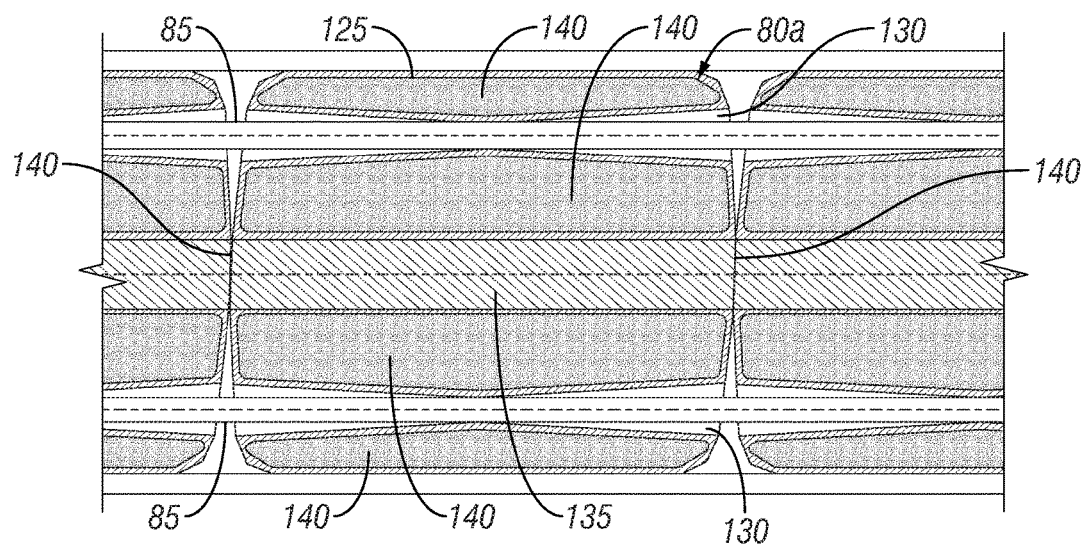
FIG. 7 illustrates a cut-away view of an example embodiment of a spacer in accordance with the present invention.

FIG. 7 illustrates a spacer 80a that can be incorporated into the streamer segment 60 shown on FIGS. 2-6 in accordance with embodiments of the present invention. As illustrated, the spacer 80a may have a protective outer covering 125 or skin. The outer covering 125 generally may function as exterior cover that protects the internal components of the spacer 80a from water intrusion, for example. In some embodiments, the outer covering 125 may be made from a flexible, acoustically transparent material, which may be a plastic and/or elastomeric material, such as polyurethane. In some embodiments, the outer covering 125 may have a thickness in a range of from about 0.5 mm to about 5 mm. In one particular embodiment, the outer covering 125 may have a thickness of about 3 mm. As illustrated, the spacer 80a may further have channels 130 for the tension members 85. In the illustrated embodiment, the tension members 85 extend through the channels 130. As previously mentioned, the tensions members 85 may be allowed to freely move in the channels 130. As further illustrated, the spacer 80a may further comprise a compression member, such as central core 135. In the illustrated embodiment, the central core 135 is located in the middle of the spacer 80a and has exterior surfaces 140 on either axial end of the spacer 80a. The exterior surfaces 140 of the central core 135 may engage adjoining exterior surfaces of adjacent spacers 80 when compressed together in the operational configuration. The central core 135 may comprise a material that can withstand the high axial loads that can be placed on the spacer 80a in the operational configuration. Void spaces in the spacer 80a may be filled with a foamed material 140, which may comprise a foamed polyurethane or other suitable foam. While not shown, the spacer 80a may further comprise channels for conductor cables and cavities for geophysical sensors, transducers, and other equipment used for geophysical data acquisition. Modifications may be made to the spacer 80a shown on FIG. 7 accommodate these additional components. For example, additional channels may be needed through the spacer 80a for the conductor cables while additional cavities may be needed for incorporation of other components. In addition, openings toward pressure sensitive area (e.g., the outer covering 125) may be need for geophysical sensors such as hydrophones to pick up pressure signals in the water. Moreover, embodiments (not illustrated) may replace the central core 135 with a structure that provides a sealed and pressure-free space inside. In some embodiments, this structure may be an eggshell or cylindrically shaped structure. However, other suitable configurations for the structure may also be suitable.

Figure 8:
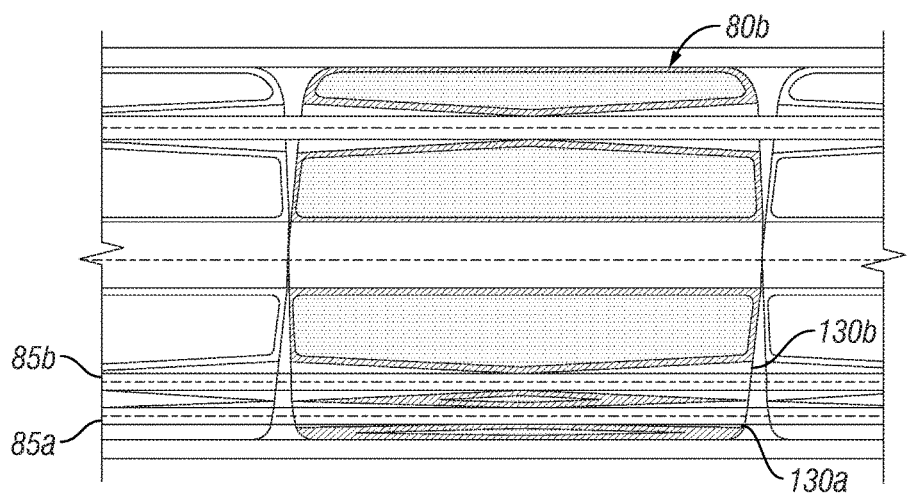
FIG. 8 illustrates a cut-away view of another example embodiment of a spacer in accordance with the present invention.
Figure 9:
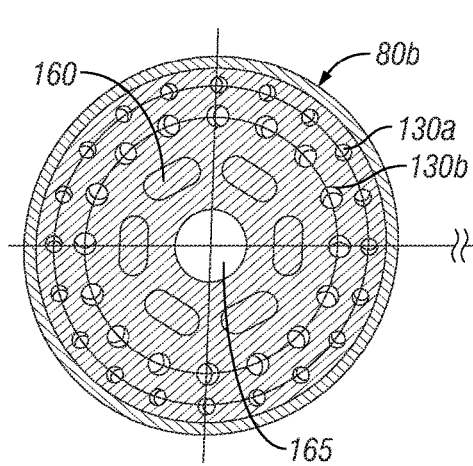
FIG. 9 illustrates an end view of an example embodiment of the spacer of FIG. 8.

FIGS. 8 and 9 illustrate a spacer 80b having two layers of tension members 85 that can be incorporated into the streamer segment 60 shown on FIGS. 2-6 in accordance with embodiments of the present invention. FIG. 8 shows a cut-away view of the spacer 80b while FIG. 9 shows an end view of the spacer 80b of FIG. 8. As best seen in FIG. 9, the spacer 80b includes a plurality of outer channels 130a and a plurality of inner channels 130b. The outer channels 130a and the inner channels 130b may be arranged to form two concentric rings. Outer tensions members 85a and inner tensions members 85b may be disposed through the outer channels 130a and the inner channels 130b, respectively. Accordingly, the spacer 80b may comprise an outer annular layer of the outer tension members 85a and an inner annular layer of the inner tension members 85b. As illustrated, the inner tension members 85b may have a larger diameter than the inner tension members 85a. In addition, channels (not shown) may be made in the spacer 80b between the inner and outer channels 130b, 130a, for example, to allow a contact between the water and the interior of the spacer 80b or a contact path between a hydrophone and the water. As illustrated by FIG. 9, the spacer 80b may further include one or more openings 160 for conductor cables (not shown) and a central opening 165 for the central core 135.

Figure 10:
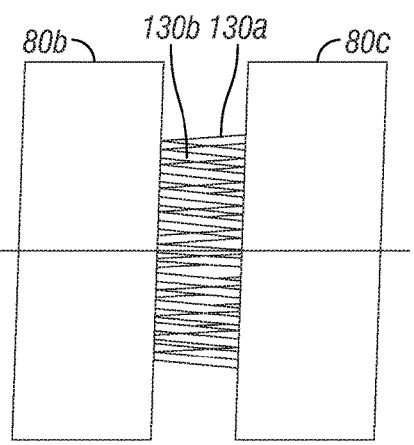
FIG. 10 illustrates a side view of an example embodiment showing tension members running between spacers in accordance with embodiments of the present invention.

In accordance with present embodiments, the outer tension members 85a and the inner tension members 85b may be wound in opposite directions as they extend through the streamer segment (e.g., streamer segment 60a shown on FIGS. 2-6), as best seen on FIG. 10. If only one layer of tension members 85 is used, the streamer segment may rotate as tension varies along the tension members 85 due to strand stiffness and elastic deformation. However, by using two concentric layers of tension members 85a, 85b each wound in different directions, torsion balance can be achieved. In some embodiments, the tension members 85a, 85b may transit between the inside and outside as they pass between spacers 80b. Because of this, the tension members 85a, 85b should not undesirably move inline during winching as they otherwise would. The inner tension members 85a may be slightly larger than the outer tension members 85 to compensate for a smaller average radius from the center of the spacer 80b. Tension in the tension members 85a, 85b should not lead to torsion because the effect of the two layers should be generally opposite and equal.

FIG. 11 illustrates an assembly 170 that comprises a plurality of streamer segments 60 coupled end-end in accordance with embodiments of the present invention. As previously mentioned, the streamer segments 60 may be coupled end-to-end and towed, for example, behind survey vessel 10 (shown on FIG. 1). In some embodiments, the assembly 170 of streamer segments 60 may be used to form a streamer or a source cable. The streamer segments 60 may be a structure for a number of items, including feed lines, gas lines, optical and/or electrical signals, power, external devices, geophysical sensors, tension sensors, and geophysical sources. In accordance with present invention, the streamer segments 60 may have a variable stiffness, wherein the streamer segments 60 have an operational configuration with an increased stiffness. Embodiments for increasing the stiffness of the streamer segments 60 in the operational configuration are discussed with respect to the preceding figures.

Accordingly, embodiments may include using a streamer having a variable stiffness in a marine survey. One of the many potential advantages is that the streamer may be made stiffer than the previously used cables. For example, embodiments of the streamer may have a higher inline stiffness which may lead to more accurate sensor positions due to smaller and more predictable elongation and creep. By way of further example, embodiments of the streamer may have higher bending stiffness which may lead to lower drag, cross-flow, and noise. In addition, embodiments of the steamer may have higher rotational stiffness leading to less motion and noise such that fewer sensors may be required to detect noise. Another potential advantage is that foamed materials may be used to substantially occupy void volumes rather than the use of oil/gels in typical streamer segments. Because foamed materials have less density that oil/gels, embodiments may include use of more tension members without undesirably increasing weight of the streamer segment.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range are specifically disclosed. Moreover, the indefinite articles "a" or "an," as used in the claims, are defined herein to mean one or more than one of the element that it introduces. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted for the purposes of understanding this invention.

What is claimed:

1. A geophysical survey method comprising:
deploying a cable into a body of water;
changing the cable from a storable configuration to an operational configuration in the body of water, wherein the operational configuration has a higher bending stiffness than the storable configuration, wherein the changing the cable from the storable configuration comprises applying tension to tension members extending through a segment of the cable, the tension not being towing tension, wherein applying the tension to the tension members compresses spacers disposed in the segment of the cable causing the spacers to align in a rigid line; and either (1) detecting a geophysical signal with a sensor disposed on the cable or (2) activating a geophysical source on the cable.

2. The method of claim 1 wherein the tension members are disposed through channels in the spacers.

3. The method of claim 1 wherein the tension applied to the tensions members is greater than towing tension applied to the tension members.

4. The method of claim 1 wherein the spacers occupy at least 90% of an internal volume of the cable.

5. The method of claim 1 wherein the cable comprises a streamer segment of a sensor streamer, wherein the streamer segment has a length of from about 10 meters to about 150 meters.

6. The method of claim 5 wherein the streamer has a length of about 200 meters or longer.

7. The method of claim 1 wherein the sensor is disposed on the cable and the method further comprises the step of detecting the geophysical signal with the sensor.

8. The method of claim 1 wherein the cable in the operable configuration has a bending stiffness of 700 Newton-square meters or greater over about 25 meters or more.

9. The method of claim 1 wherein the changing the cable from a storable configuration to an operational configuration comprises moving an actuator plate outward to transfer force to tension members causing the tensioning members to move axially, wherein movement of the tension members cause a distal plate to compress spacers into a rigid line, wherein the spacers are disposed in an internal volume of the cable, wherein a proximal plate and the actuator plate are located at a proximal end of the spacer, wherein the distal plate is located at a distal end of the spacer, and wherein the tension members extend through the spacers along a length of the cable.

10. A sensor streamer comprising:
   a plurality of streamer segments, wherein at least one of the streamer segments comprises:
   a jacket;
   a plurality of spacers disposed in the jacket along a length of the at least one of the streamer segments;
   a proximal plate at a proximal end of the at least one of the streamer segments;
   a distal plate at a distal end of the at least one of the streamer segments, wherein the spacers are disposed between the proximal plate and the distal plate;
   an actuator plate at the proximal end;
   a plurality of tension members that extend along a length of the at least one of the streamer segments, wherein the tension members extend from the proximal end to the distal end; and
   a tensioning actuator operable to transfer mechanical force to the actuator plate through the plurality of tension members.

11. The sensor streamer of claim 10, wherein the at least one of the streamer segments has a length of from about 10 meters to about 150 meters.

12. The sensor streamer of claim 11, wherein the sensor streamer has a length of about 200 meters or longer, and wherein the plurality of streamer segments are connected end to end.

13. The sensor streamer of claim 10, wherein the spacers comprise a foamed material, and wherein the tension members comprise at least one member selected from the group consisting of a cable and a fiber rope.

14. The sensor streamer of claim 10, wherein the spacers occupy at least 90% of an internal volume of the at least one of the streamer segments.

15. The sensor streamer of claim 10, wherein the tensioning actuator comprises a linear drive operable to generate motion in a straight line to move the actuator plate.

16. The sensor streamer of claim 10, wherein the tension members extend proximally beyond the proximal plate and the actuator plate, and wherein the tension members extend from the proximal end through the spacers and the distal plate.

17. The sensor streamer of claim 16, wherein the tension members are translatable axially with respect to the actuator plate, the proximal plate, the distal plate, and the spacers, and wherein mechanical stops at the proximal end and the distal end engage the tension members.

18. The sensor streamer of claim 16, wherein a mechanical stop at the distal end is spring loaded with at least one spring between the mechanical stop and the distal plate such that, as tension is applied to the tension members, the at least one spring is compressed, and wherein a mechanical stop at the proximal end engages the actuator plate as the actuator plate translates.

19. A sensor streamer comprising:
   a plurality of streamer segments, wherein at least one of the streamer segments comprises:
   a jacket;
   a plurality of spacers disposed in the jacket along a length of the at least one of the streamer segments;
   a proximal plate at a proximal end of the at least one of the streamer segments;
   a distal plate at a distal end of the at least one of the streamer segments, wherein the spacers are disposed between the proximal plate and the distal plate;
   an actuator plate at the proximal end;
   a plurality of tension members that extend along a length of the at least one of the streamer segments, wherein the tension members extend from the proximal end to the distal end, wherein the tension members are translatable axially with respect to the actuator plate, the proximal plate, the distal plate, and the spacers, and wherein mechanical stops at the proximal end and the distal end engage the tension members; and
   a tensioning actuator operable to transfer mechanical force to the actuator plate.

20. A sensor streamer comprising:
   a plurality of streamer segments, wherein at least one of the streamer segments comprises:
   a jacket;
   a plurality of spacers disposed in the jacket along a length of the at least one of the streamer segments;
   a proximal plate at a proximal end of the at least one of the streamer segments;
   a distal plate at a distal end of the at least one of the streamer segments, wherein the spacers are disposed between the proximal plate and the distal plate;
   an actuator plate at the proximal end;
   a plurality of tension members that extend along a length of the at least one of the streamer segments, wherein the tension members extend from the proximal end to the distal end, wherein the tension members extend proximally beyond the proximal plate and the actuator plate, wherein the tension members extend from the proximal end through the spacers and the distal plate, wherein a mechanical stop at the distal end is spring loaded with at least one spring between the mechanical stop and the distal plate such that, as tension is applied to the tension members, the at least one spring is compressed, and wherein a mechanical stop at the proximal end engages the actuator plate as the actuator plate translates; and a tensioning actuator operable to transfer mechanical force to the actuator plate.

21. A geophysical survey method comprising:

deploying a cable into a body of water;

changing the cable from a storable configuration to an operational configuration in the body of water, wherein the operational configuration has a higher bending stiffness than the storable configuration, wherein the changing the cable from a storable configuration to an operational configuration comprises moving an actuator plate outward to transfer force to tension members causing the tensioning members to move axially, wherein movement of the tension members cause a distal plate to compress spacers into a rigid line, wherein the spacers are disposed in an internal volume of the cable, wherein a proximal plate and the actuator plate are located at a proximal end of the spacer, wherein the distal plate is located at a distal end of the spacer, and wherein the tension members extend through the spacers along a length of the cable; and either (1) detecting a geophysical signal with a sensor disposed on the cable or (2) activating a geophysical source on the cable.

* * * * *